Patented Apr. 7, 1942

2,279,088

UNITED STATES PATENT OFFICE 2,279,088

PURIFICATION OF SODIUM MONOXIDE

Harvey N. Gilbert, Niagara Falls, N. Y., assignor to E. I. du Pont de Nemours & Company, Wilmington, Del., a corporation of Delaware No Drawing. Application March 27, 1940, Serial No. 326,268

4 Claims. (Cl. 23—184)

This invention relates to the purification of sodium monoxide and more particularly to the removal of free sodium from sodium monoxide.

Sodium monoxide which is made by reacting sodium with oxygen or air often contains small amounts of unreacted sodium. While it is possible to produce sodium monoxide which is substantially free from unreacted sodium, this requires careful control and close supervision of the oxidation process. The presence of free sodium in sodium monoxide is disadvantageous for many uses for which this material may be utilized. When sodium monoxide containing sodium is added to water, the sodium present reacts violently with the water evolving hydrogen and the hydrogen may become ignited because of the high heat of the reaction. This makes such operations hazardous especially when the sodium monoxide is added to inflammable organic materials which may contain more or less moisture. Accordingly, for certain uses of sodium monoxide to avoid the hazard of explosions and fires, it is essential that the sodium monoxide be substantially free from metallic sodium or contain a sufficiently small amount of sodium so that no hydrogen explosions or "flashes" occur when the monoxide is contacted with water.

The present invention is concerned with the commercial grade of sodium monoxide made by the so-called Carveth process, which process is based on the ability of porous sodium monoxide particles to absorb molten sodium. In this process, unless special precautions are observed, the product contains up to around 0.5% by weight of free sodium which has been absorbed in the particles of monoxide. This product, therefore, is a granular or finely-divided material which may have a bluish or grayish color due to the presence of free sodium dispersed inside the individual particles or some of them.

It is known that if sodium monoxide containing unreacted sodium is heated in the presence of oxygen or in the open air for a sufficient time, all of the free sodium will become oxidized. However, this method is not satisfactory for purifying the sodium monoxide. If the temperature is raised sufficiently high to oxidize the free sodium, an excessive amount of the monoxide is oxidized to peroxide. On the other hand, if the temperature is sufficiently low to keep peroxide formation at a reasonable minimum, the free sodium is not attacked by the oxygen. For example, I have heated sodium monoxide containing about 0.5% by weight of free sodium in a stream of pure oxygen at temperatures up to 145° C. for two hours, with no appreciable decrease in free sodium content.

An object of the present invention is to provide an improved method for making sodium monoxide of a high degree of purity which is substantially free from metallic sodium. A further object is to provide a means for removing metallic sodium from sodium monoxide. Another object is to provide a means for bringing sodium absorbed in sodium monoxide into a reactive state. Other objects will be apparent from the following description of my invention.

The above objects may be attained in accordance with the present invention by heating the sodium monoxide in finely-divided or granular form in a closed space or under an inert gas to a temperature not lower than 250° C. For example, a convenient and preferred method consists in heating granular sodium monoxide in a closed container at a temperature of 250 to 400° C. In this method, an air-tight steel container is substantially filled with the monoxide so that there is little or no air space above the monoxide in the container. The container then is sealed airtight and placed in a furnace. The heating is continued until all parts of the monoxide have been heated to at least 250° C. The time required for such heating will vary, depending on the size of the container and distance from the container wall to the center of the mass of monoxide. By this treatment, the monoxide, which originally has a bluish or grayish color due to the presence of free sodium, is converted to a white product which gives no evidence of free sodium when contacted with water.

In the practice of my invention, it is essential that the monoxide be heated to a temperature not lower than 250° C. At lower temperatures, I have found that no appreciable oxidation of the free sodium occurs, even in the presence of pure oxygen. The temperature of 250° C. is necessary to make the sodium available for oxidation. I have discovered that when the monoxide is heated to 250° C. a change in surface tension occurs which causes the liquid sodium to come out of the particles of monoxide which had absorbed it and form a film of liquid sodium about each particle and on the wall of the container. Thus, I have heated a granular blue sodium monoxide in a glass container under nitrogen, slowly raising the temperature, and have observed that when the temperature reached 250° C., each particle of monoxide acquired a bright, metallic film of liquid sodium. The liquid sodium also formed a film on the container wall. Hence, by heating monoxide in a closed container to 250° C. or higher, I drive out the liquid sodium from the particles which had absorbed it and cause it to spread out in a thin film which is readily oxidized. The air present in the interstices of the granular mass furnishes sufficient oxygen to oxidize the metallic sodium. There is no excessive oxidation of monoxide to peroxide, probably because the excess of oxygen is small and the film of sodium on the monoxide granules acts as a protective layer, insuring selective oxidation of the sodium.

My invention is not restricted to heating the monoxide in a closed container, as described above. It will be apparent that various other methods may be utilized to heat the monoxide in the presence of a limited amount of oxygen. For example, the monoxide may be heated in the atmosphere of an inert gas. The inert gas may be pure or may contain a small amount of oxygen, e. g. 1 to 2% by volume. Ordinarily, it will not be necessary to add oxygen to the inert gas, since the air originally in the interstices of the granular monoxide usually will provide sufficient oxygen. As inert gas, I may use, for example, nitrogen or one of the rare gases, argon, helium, or neon. The ordinary commercial high purity nitrogen, which contains about 0.5 to 1% by volume of oxygen is suitable. For complete oxidation of the free sodium, whether or not inert gas is introduced, there must be present sufficient oxygen to react with the free sodium present. Preferably, the oxygen present should not be more than about twice that amount; in any event, it should not exceed the amount that will oxidize about 5% of the monoxide to peroxide.

While I prefer to heat the monoxide to a temperature of 250 to 400° C. and the temperature must be not less than 250° C., my invention is not restricted to the temperature range indicated. That is, the temperature may be increased above 400° C. if desired, even up to just below the melting point of the monoxide. Usually, there is no advantage in employing temperatures above 400° C., except to decrease the time required to heat the entire mass up to the minimum temperature of 250° C.

In its broader aspects, my invention primarily relates to a means for bringing metallic sodium absorbed in the monoxide into a reactive state. That is, by heating the monoxide to the point where a change in surface tension occurs, the absorbed sodium is forced out of the monoxide particles and forms a reactive film. It then may be reacted, not only with oxygen, but with other substances reactive towards sodium. Thus, by heating the monoxide in the absence of oxygen until the sodium film is formed, I may react the sodium with various substances, to form a mixture of the monoxide and the sodium compounds formed by such reactions. Thus, by reacting with a halogen gas or vapor (chlorine, fluorine, bromine, or iodine) in an amount equivalent to all or part of the sodium present, I may form a coating of the corresponding sodium halide on the monoxide particles. In place of a halogen, I can employ vapors of water; alcohols, halogenated hydrocarbons, or other organic chemicals reactive with sodium; and various inorganic gases or vapors reactive with sodium, as sulfur, hydrogen sulfide, sulfur dioxide, oxides of nitrogen, and the like.

I claim:

1. The process for removing free sodium from finely divided sodium monoxide containing up to 0.5% by weight of absorbed metallic sodium which comprises heating said monoxide to a temperature not lower than 250° C. in the presence of a gas reactive with sodium, which gas is present in an amount not greater than that which can be confined in the interstices between the monoxide particles in bulk mass and absorbed in said particles.

2. The process for removing free sodium from finely-divided sodium monoxide containing up to 0.5% by weight of absorbed metallic sodium which comprises heating said monoxide to a temperature not lower than 250° C. in the presence of an amount of oxygen which is not substantially greater than that normally present in air confined in the interstices between the monoxide particles in bulk mass and adsorbed in said particles.

3. The process for removing free sodium from finely-divided sodium monoxide containing up to 0.5% by weight of absorbed metallic sodium which comprises heating said monoxide to a temperature not lower than 250° C. in a closed container which is substantially completely filled with said monoxide.

4. The process for removing free sodium from granular sodium monoxide containing up to 0.5% by weight of absorbed metallic sodium which comprises heating said monoxide in an atmosphere of nitrogen which contains not more than about 1% by volume of oxygen to a temperature of 250 to 400° C.

HARVEY N. GILBERT.